United States Patent
Cragun et al.

(10) Patent No.: US 9,563,422 B2
(45) Date of Patent: Feb. 7, 2017

(54) EVALUATING ACCESSIBILITY COMPLIANCE OF A USER INTERFACE DESIGN

(71) Applicant: International Business Machines Corporation, Armonk, NY (US)

(72) Inventors: Brian J. Cragun, Rochester, MN (US); Vikrant Nandakumar, Chennai (IN); Nitendra Rajput, Haryana (IN); Puthukode G. Ramachandran, Austin, TX (US); Vivek Sharma, Bangalore (IN); Shunguo Yan, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 242 days.

(21) Appl. No.: 14/149,975

(22) Filed: Jan. 8, 2014

(65) Prior Publication Data

US 2015/0193091 A1 Jul. 9, 2015

(51) Int. Cl.
G06F 9/44 (2006.01)
G06F 11/36 (2006.01)

(52) U.S. Cl.
CPC ............ *G06F 8/77* (2013.01); *G06F 11/3604* (2013.01); *G06F 11/3668* (2013.01); *G06F 9/4443* (2013.01)

(58) Field of Classification Search
CPC ......................... G06F 11/3604–11/3616; G06F 11/3668–11/3696; G06F 9/4443
See application file for complete search history.

(56) References Cited

U.S. PATENT DOCUMENTS

| 8,060,863 | B2 | 11/2011 | Brunswig et al. |
| 8,127,252 | B2* | 2/2012 | McKeon ............... G06F 9/4443 715/853 |
| 8,196,104 | B2 | 6/2012 | Cohrs et al. |
| 8,543,986 | B2 | 9/2013 | Murthy et al. |
| 8,566,648 | B2 | 10/2013 | Schroeder |
| 9,071,518 | B2 | 6/2015 | Malik et al. |
| 2006/0047627 | A1* | 3/2006 | Gartner ................. G06F 9/4443 |

(Continued)

OTHER PUBLICATIONS

Abascal, Julio, et al. "The use of guidelines to automatically verify Web accessibility." Universal Access in the Information Society 3.1 (2004): 71-79.*

(Continued)

*Primary Examiner* — Jennifer To
*Assistant Examiner* — Liang Li
(74) *Attorney, Agent, or Firm* — Garg Law Firm, PLLC; Rakesh Garg; William J. Stock (57) ABSTRACT

A method, system, and computer program product for evaluating compliance of a user interface design are provided in the illustrative embodiments. A hierarchy of elements of a user interface is received from a first application executing in a client data processing system. A second application presents the user interface including a set of user interface elements at the client data processing system. A compliance rule is selected from a set of compliance rules. An evaluation is made whether an attribute associated with a user interface element meets a condition specified in the compliance rule. Responsive to the evaluating being negative, the user interface element is reported as being non-compliant with the compliance rule.

19 Claims, 6 Drawing Sheets

(56) References Cited

U.S. PATENT DOCUMENTS

| | | | |
|---|---|---|---|
| 2006/0195819 A1 | 8/2006 | Chory et al. | |
| 2009/0300709 A1 | 12/2009 | Chen et al. | |
| 2012/0077546 A1 | 3/2012 | Kawa et al. | |
| 2012/0198368 A1* | 8/2012 | Bornheimer | G06F 8/77 715/763 |
| 2012/0324424 A1* | 12/2012 | Breeds | G06F 11/3684 717/110 |
| 2013/0191811 A1 | 7/2013 | Peck et al. | |
| 2014/0344732 A1* | 11/2014 | Kastrinogiannis | G06F 8/71 715/765 |
| 2014/0351796 A1* | 11/2014 | Gur-esh | G06F 11/3604 717/126 |
| 2014/0366005 A1* | 12/2014 | Kozhuharov | G06F 11/3664 717/125 |

OTHER PUBLICATIONS

A. Memon, A. Nagarajan, and Q. Xie, "Automating Regression Testing for Evolving GUI Software," J. Software Maintenance and Evolution: Research and Practice, vol. 17, No. 1, pp. 27-64, 2005.*

Apple Inc; Verifying App Accessibility on iOS, Apr. 23, 2013.
Android; Android Lint, Nov. 15, 2015.
Eclipse Foundation; Accessibility Tools Framework (ACTF), 2015.
Karasiewicz, Selecting a Mobile UI Framework, Aug. 28 2013.
Kipar, Test Automation for Mobile Hybrid Applications, 40 pages, May 20, 2014.
IOS, Automating UI Testing, https://developer.apple.com/library/IOs/documentation/DeveloperTools/Conceptual/InstrumentsUserGuide/UsingtheAutomationInstrument/UsingtheAutomationInstrument.html, 2014.
Android, UI Testing, http://developer.android.com/tools/testing/testing_ui.html, 2014.
Apple Inc., About accessibility verification on IOS, 2013.
Jus; Beyond Specifications: Towards a Practical Methodology for Evaluating Web Accessibility, vol. 5, Issue 4, Aug. 2010, pp. 157-171.
Springer Link; People with disabilities: automatic and manual evaluation of web sites, vol. 4061, 2006, pp. 152-155.
IBM; RAtional Policy Tester Accessibility Edition, Aug. 19, 2014.
Appendix P, Nov. 18, 2015.

* cited by examiner

EVALUATING ACCESSIBILITY COMPLIANCE OF A USER INTERFACE DESIGN

TECHNICAL FIELD

The present invention relates generally to a method, system, and computer program product for evaluating the user interfaces used on computing devices. More particularly, the present invention relates to a method, system, and computer program product for evaluating accessibility compliance of a user interface design.

BACKGROUND

Almost all data processing systems, including mobile devices, include some manner of interacting with a user. For example, a display device is used with a data processing system for presenting a visual user interface to a user, an audio device is used with the data processing system for presenting audible user interface to the user, and tactile devices are used for presenting a tactile interface to the user. Within the scope of the disclosure, the term "user interface" refers to a user interface of any of these types or other types as may be suitable for a particular implementation.

Accessibility features are features of a user interface that are designed or configured to assist a user in interacting with a particular aspect of a given user interface. For example, a large default font size is an example accessibility feature that makes interacting with a user interface easier for those users who have weak eyesight. Similarly, an audio readout accessibility feature assists users with vision impairment to interact with a user interface. A tactile feedback, such as vibration of a mobile device, is another example accessibility feature for users who have temporary, circumstantial, or permanent auditory impairment.

Many accessibility features are presently available for use in user interface designs. Often, an application executing on a data processing system presents several user interfaces to the user during the course of using the application. For example, numerous user interfaces in the forms of screen layouts, plugin applications, and tools are presented or called upon during the course of a user using a software application.

SUMMARY

The illustrative embodiments provide a method, system, and computer program product for evaluating accessibility compliance of a user interface design. An embodiment includes a method for evaluating compliance of a user interface design. The embodiment receives, from a first application executing in a client data processing system, a hierarchy of elements of a user interface, wherein a second application presents the user interface including a set of user interface elements at the client data processing system. The embodiment selects a compliance rule from a set of compliance rules. The embodiment evaluates, using a processor and a memory, whether an attribute associated with a user interface element meets a condition specified in the compliance rule. The embodiment reports, responsive to the evaluating being negative, the user interface element as being non-compliant with the compliance rule.

Another embodiment includes a computer usable program product comprising a computer usable storage device including computer usable code for evaluating compliance of a user interface design. The embodiment further includes computer usable code for receiving, from a first application executing in a client data processing system, a hierarchy of elements of a user interface, wherein a second application presents the user interface including a set of user interface elements at the client data processing system. The embodiment further includes computer usable code for selecting a compliance rule from a set of compliance rules. The embodiment further includes computer usable code for evaluating whether an attribute associated with a user interface element meets a condition specified in the compliance rule. The embodiment further includes computer usable code for reporting, responsive to the evaluating being negative, the user interface element as being non-compliant with the compliance rule.

Another embodiment includes a data processing system for evaluating compliance of a user interface design. The embodiment further includes a storage device including a storage medium, wherein the storage device stores computer usable program code. The embodiment further includes a processor, wherein the processor executes the computer usable program code. The embodiment further includes computer usable code for receiving, from a first application executing in a client data processing system, a hierarchy of elements of a user interface, wherein a second application presents the user interface including a set of user interface elements at the client data processing system. The embodiment further includes computer usable code for selecting a compliance rule from a set of compliance rules. The embodiment further includes computer usable code for evaluating whether an attribute associated with a user interface element meets a condition specified in the compliance rule. The embodiment further includes computer usable code for reporting, responsive to the evaluating being negative, the user interface element as being non-compliant with the compliance rule.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

The illustrative embodiments recognize accessibility features of a user interface are largely implementation dependent, and therefore are decided by software manufacturers and software developers. Standards and specifications for some accessibility features presently exist, with new accessibility features and their specifications evolving with the advancement of technology.

Presently, verifying compliance of an accessibility feature with a specification is also dependent upon the participation of the software manufacturer, the software developer, and/or the user. For example, some software manufacturers include accessibility testing as a part of software testing activity and include an accessibility compliance report generated therefrom with the software. Some other software products are distributed with manufacturer-supplied accessibility testing tools bundled with the software.

The illustrative embodiments recognize that because of such reasons, the presently available methods for accessibility compliance checking are non-uniform across applications. The illustrative embodiments further recognize that the presently available accessibility compliance checking methods are static, to wit, they check for accessibility compliance according to the accessibility compliance rules existing at the time the packaged report or tool was created, according to the accessibility compliance rules controlled by manufacturers or developers, and according to a manner of applying those accessibility compliance rules selected by the manufacturer or developer.

Many accessibility features depend on, or are a result of rules. For example, a rule interpreted from a government law, an industrial standard, a usability specification, or industry best practice often forms a basis for an accessibility feature.

The illustrative embodiments recognize that many entities can contribute accessibility compliance rules at any given time. For example, different standards bodies can promulgate or recommend different sets of accessibility compliance rules as applicable to different accessibility features, different geographical locales, different devices or technological components involved, government or governing regulations, and many other factors. As another example, an association of interested parties, e.g. an association of software manufacturers, software developers, users, device manufacturers, or public interest groups, can similarly contribute one or more sets of accessibility compliance rules, policies, preferences, guidelines, or recommendations. An accessibility compliance rule, policy, preference, guideline, regulation, recommendation, or specification is collectively referred to herein as an accessibility compliance rule or simply a rule.

Furthermore, such sets of rules can be overlapping, can have an order of preference or application, can have different effective periods, can be provided in different forms, and can be differently applicable or not applicable according to circumstances. Additionally, an entity may wish to add supplementary rules, prioritize certain rules, or determine to ignore other rules generally or in certain conditions. Various rule sets may also apply differently depending on device usage, markets, or device capabilities. The illustrative embodiments recognize that the presently available methods of accessibility compliance checking are not conducive to making an on-demand, unbiased, comprehensive, current, and selective accessibility compliance check of a user interface.

Depending on its nature, an accessibility feature can be statically created on an interface during the design of the interface, or dynamically added to the interface during running of a program by using preset values, a result generated from a program logic, or based on input from a user. Regardless of how created, an accessibility feature has to be tested as a part of testing the overall user interface.

Testing user interfaces presently requires laborious manual testing by persons with special training. Not only can such testing methods be expensive, such presently used testing methods frustrate modern coding practices such as Agile and Continuous Delivery, which are designed to take advantage of automated testing methods. Further, while there are compliance checking tools for the HTML-based application which analyze the page using the page structure of the document object model (DOM), the technology doesn't work for the applications that are directly created from a object language (such as C, Objective-C or Java™) in which the source code or compiled binary cannot be directly used for accessibility evaluation.

The illustrative embodiments used to describe the invention generally address and solve the above-described problems and other problems related to compliance checking of user interface features. The illustrative embodiments provide a method, system, and computer program product for evaluating accessibility compliance of a user interface design.

An embodiment constructs a hierarchy of elements of a user interface dynamically during the running of a program, identifying in the hierarchy any accessibility attributes associated with the elements. In one embodiment, the construction of a hierarchy is responsive to detecting an event on a data processing system. For example, one embodiment detects a launch of an application on a data processing system to identify a user interface that is presented as a result of the launch. Another embodiment detects a change of the user interface, e.g., a change in the layout or composition of an existing user interface resulting from a user action, a system action, a transaction, or a computation. Generally, any manner of identifying a user interface is response to any type of event is contemplated within the scope of the illustrative embodiments.

An embodiment constructs the hierarchy using a description of the user interface. For example, an application designed to run on Android™ platform uses a layout description file in eXtensible Markup Language (XML) that specifies how the interface should appear on the screen of a user device (Android is a trademark of Google Inc. in the United States and in other countries). Such description identifies various elements and their attributes present in the user interface. While some such descriptions may include a hierarchy of elements of their own, a hierarchy of elements for accessibility compliance according to an embodiment is distinct from such hierarchy in the description of the user interface.

For example, the description may include a hierarchy of a set of elements according to an order of use on the user interface, but a hierarchy according to an embodiment regroups, reclassifies, replicates, or otherwise reorganizes the elements according to common properties in subsets of the elements, thereby making the embodiment's hierarchy distinct from the hierarchy of the user interface description. As another example, a hierarchy according to an embodiment omits certain elements appearing in the hierarchy in the description when those elements are known or determined to be irrelevant to accessibility features, thereby making the embodiment's hierarchy distinct from the hierarchy of the user interface description.

As another example, the description may include a hierarchy of a set of only those elements that are present in the user interface but not the elements that are resolved, created, or presented as a result of a run-time activity on the user interface. A hierarchy according to an embodiment explores such unidentified or run-time elements, and includes them in the hierarchy, thereby making the embodiment's hierarchy distinct from the hierarchy of the user interface description. Some examples of such elements are controls on an audio or video plugin that is called when the user interacts with audio or video content, and controls or features on a magnification tool or a utility that is activated in response to a user interaction with a control or content on the user interface. A hierarchy may include other attributes (such as screen coordinate of an element) necessary to determine or markup an element to be included in the accessibility report. A hierarchy may also include calculated attributes for an element from a hierarchical structure, for example, color contrast for a layered view structures such as a button with a label or an image button.

An embodiment constructs the hierarchy of elements for accessibility compliance checking for nested or structured elements of the user interface as well. For example, when a user interface includes a container element in a parent-child relationship with one or more contained elements, an embodiment traverses such containers to the lowest level contained elements. For insertion into the hierarchy according to an embodiment, the embodiment considers not only the attributes associated with the lowest level contained element but also the attributes available at the element by inheritance from one or more parent container elements of the user interface.

In addition to the interface hierarchy, an embodiment further associates a screenshot of the interface with the hierarchy to assist identification, recognition, or markup of an element in the accessibility hierarchy.

Another embodiment receives the hierarchy constructed in any of these manners for evaluating accessibility compliance. In one implementation, such an embodiment is implemented in a server computer and receives the hierarchy from another embodiment executing in a client computer or device. In another implementation, the server computer is a part of a cloud computing environment. In another implementation, the embodiment that receives the hierarchy and performs the compliance evaluation is configured as a service available from a server or a cloud, and usable by a variety of client applications, client devices, client operating systems, and generally any type of client environment.

An embodiment for compliance evaluation accesses a set of accessibility compliance rules in a repository. Any number of entities can contribute to the repository any number and types of accessibility compliance rules, at any time, and with any restrictions or conditions on their use. The embodiment selects one or more rules according to a user profile, an application profile, a standard, or a combination thereof. For example, a normalized profile for users with certain disabilities can help select certain rules but not others such that the selected rules test the compliance of the accessibility features relevant to the disability. Similarly, an application profile can select those rules that check for compliance of accessibility features commonly found in applications fitting that profile, and not others. Profile-based rule selection is optional in an embodiment to optimize evaluation time, cost, or user-experience.

An embodiment determines whether one or more elements in received hierarchy meet, exceed, or fail an accessibility specification according to a selected rule. One embodiment generates an accessibility compliance report that includes reports of elements that fail the compliance evaluation. Another embodiment generates an accessibility compliance report that includes reports of elements that pass the compliance evaluation as well as the elements that fail the compliance evaluation.

Another embodiment generates an accessibility compliance report that includes reports of elements that fail the compliance evaluation along with a severity of the failure. For example, non-compliance of one element may be acceptable in a given situation whereas non-compliance of another element may not. In some cases, a warning about the non-compliance of an element may be sufficient, and in other cases, a notification about a possible non-compliance may be warranted. As another example, non-compliance of an element in one attribute of accessibility may indicate one level of severity or consequences whereas non-compliance of an element in another attribute of accessibility, or in more than a threshold number of attributes, may indicate another level of severity or consequences.

An embodiment further generates an accessibility compliance report that includes reports of elements that fail the compliance evaluation along with a recommended remedy for curing the failure. For example, an accessibility specification may specify a remedy for a failure condition. An embodiment matches the condition why an element failed accessibility compliance evaluation with such failure condition, and recommends the corresponding remedy in the report.

The illustrative embodiments are described with respect to certain user interfaces, elements, attributes, accessibility features, rules, data processing systems, environments, components, and applications only as examples. Any specific manifestations of such artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 1:
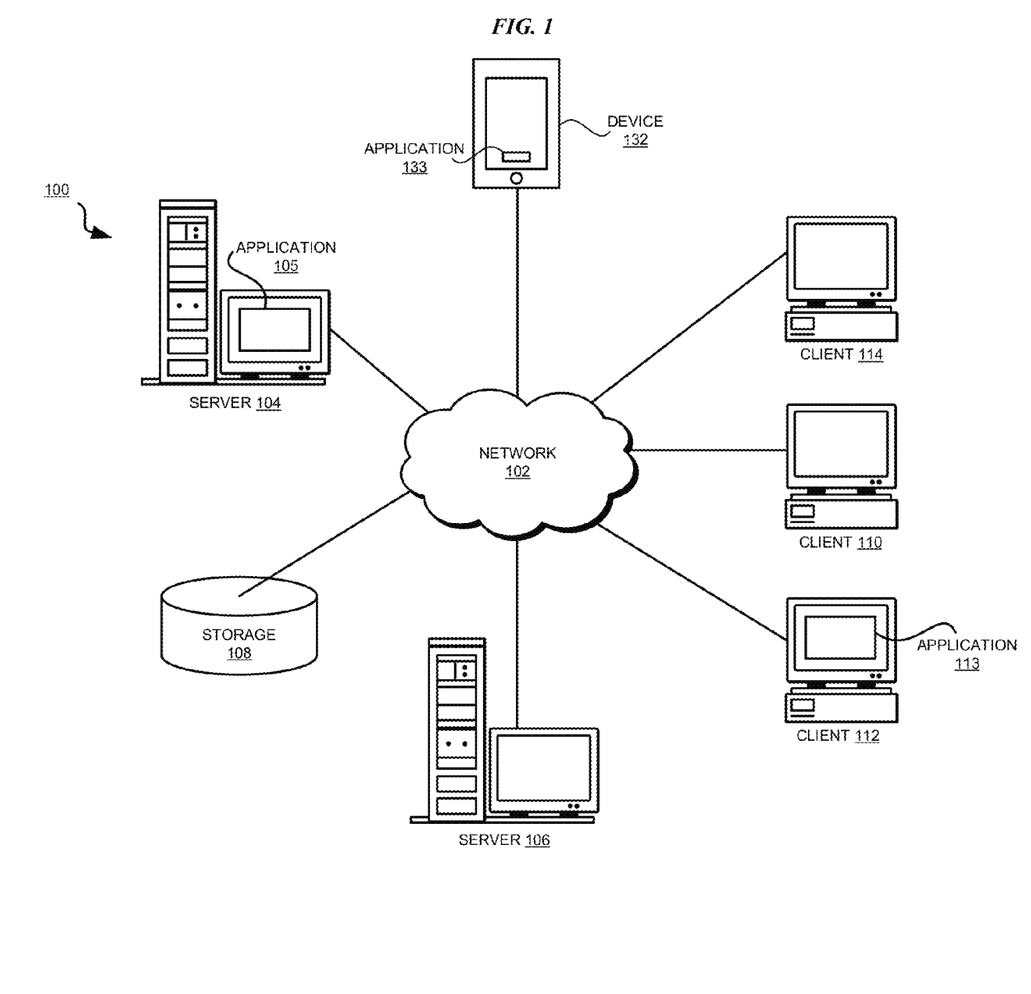
FIG. 1 depicts a block diagram of a network of data processing systems in which illustrative embodiments may be implemented.
Figure 2:
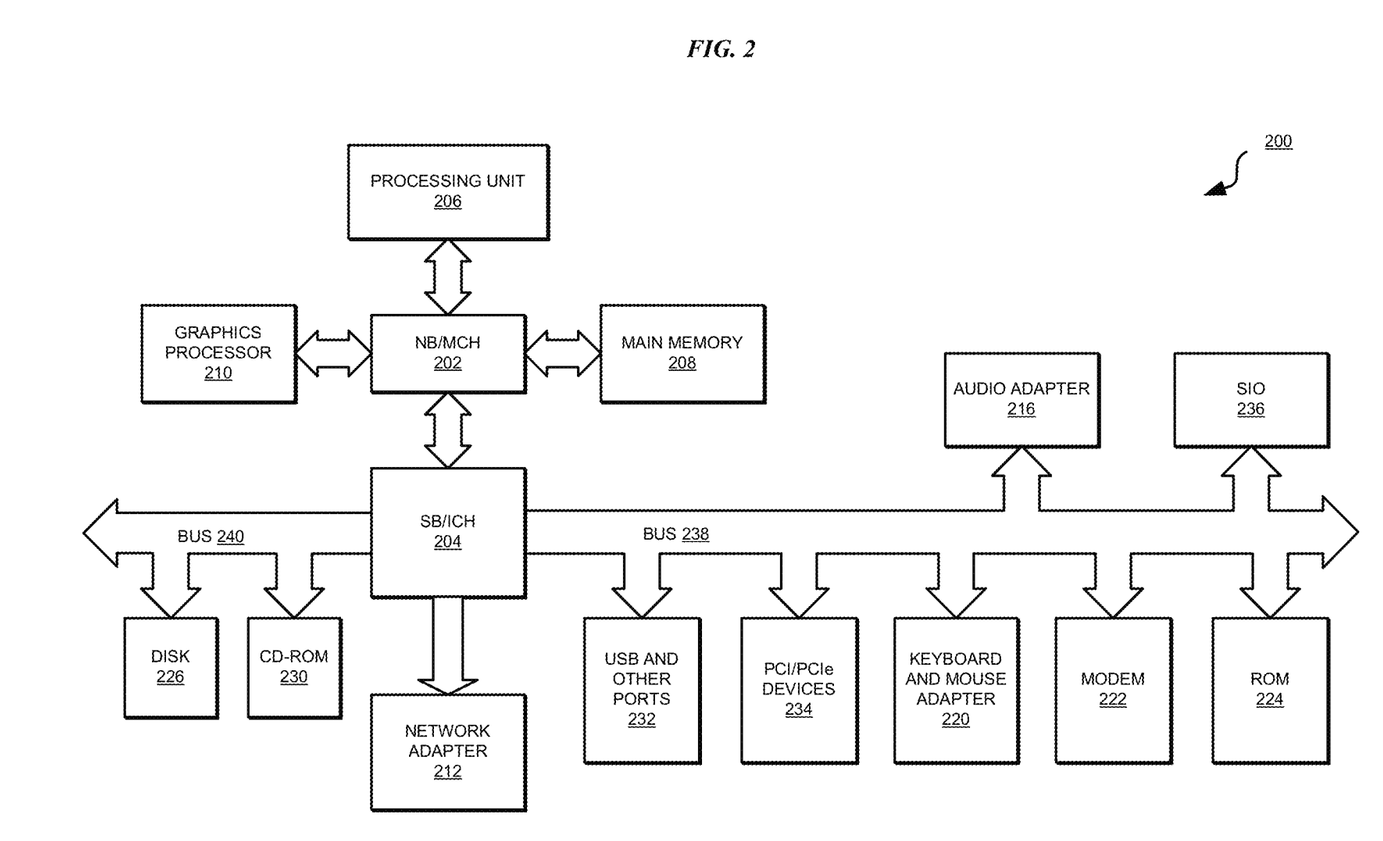
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of data processing systems in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any data processing system or device in data processing environment 100. Clients 110, 112, and 114 also couple to network 102. A data processing system, such as server 104 or 106, or client 110, 112, or 114 may contain data and may have software applications or software tools executing thereon.

In addition, device 132 may be a data processing system in the form of a mobile device. Device 132 is able to communicate with network 102 using wireless communication 120.

Only as an example, and without implying any limitation to such architecture, FIG. 1 depicts certain components that are usable in an example implementation of an embodiment. Servers 104 and 106, and clients 110, 112, 114, are depicted as servers and clients only as example. Data processing systems 104, 106, 110, 112, and 114 also represent example nodes in a cluster, partitions, and other configurations suitable for implementing an embodiment. For example, Device 132 is any suitable mobile computing platform, for example, a smartphone, tablet computer, a portable data processing device, an embedded device, an appliance, a device integrated into a vehicle or a system, or a wearable computing device. Device 132 includes application 133, which implements an embodiment for constructing a hierarchy as described herein. Client 112 similarly includes application 113, which implements an embodiment for constructing a hierarchy as described herein. Server 104 includes application 105, which includes an embodiment for performing the evaluation as described herein. In one implementation, server 104 comprises one or more physical or virtual data processing systems in a cloud computing environment, and application 105 is a service, accessible to application 113 or 133 over network 102.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

Servers 104 and 106, storage unit 108, and clients 110, 112, and 114 may couple to network 102 using wired connections, wireless communication protocols, or other suitable data connectivity. For example, a cluster typically has multiple network types, such as IP networks, direct connections of machines via packets exchange implemented by storage protocols (Fibre Channel, SCSI), serial links, and message exchange via writing and reading packets to shared storage such as a hard disk drive. For performance reasons, in sending client traffic, an IP network is given precedence. Furthermore, a given network type may not connect to all nodes in a cluster. For instance, a cluster may span machines located at two geographically distant sites. For the long distance connection, Ethernet may be the preferred connection, and within a geographical location, a direct connection may be preferable. Additionally, within a geographical location, additional non-IP networks, such as Fibre channel or serial connections may be used within the scope of the illustrative embodiments.

Clients 110, 112, and 114 may be, for example, personal computers, network computers, thin clients, or industrial control systems. In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another, and encompasses components including but not limited to IP and SAN components. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), a wide area network (WAN), or mobile ad hoc network (MANET). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104, server 106, or client 112 in FIG. 1, or another type of device in which computer usable program code or instructions implementing the processes of the illustrative embodiments may be located for the illustrative embodiments. Data processing system 200 is also representative of a device, such as device 132 in FIG. 1 in which computer usable program code or instructions implementing the processes of the illustrative embodiments may be located for the illustrative embodiments. Data processing system 200 is described as a computer only as an example, without being limited thereto. Implementations in the form of device 132 in FIG. 1 may modify data processing system 200 and even eliminate certain depicted components there from without departing from the general description of the operations and functions of data processing system 200 described herein.

In the depicted example, data processing system 200 employs a hub architecture including North Bridge and memory controller hub (NB/MCH) 202 and south bridge and input/output (I/O) controller hub (SB/ICH) 204. Processing unit 206, main memory 208, and graphics processor 210 are coupled to north bridge and memory controller hub (NB/MCH) 202. Processing unit 206 may include one or more processors and may be implemented using one or more heterogeneous processor systems. Graphics processor 210 may be coupled to NB/MCH 202 through an accelerated graphics port (AGP) in certain implementations.

In the depicted example, local area network (LAN) adapter 212 is coupled to south bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238. Hard disk drive (HDD) 226 and CD-ROM 230 are coupled to south bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub (SB/ICH) 204 through bus 238.

An operating system runs on processing unit 206. The operating system coordinates and provides control of various components within data processing system 200 in FIG. 2. The operating system may be a commercially available operating system such as Microsoft® Windows® (Microsoft and Windows are trademarks of Microsoft Corporation in the United States, other countries, or both), or Linux® (Linux is a trademark of Linus Torvalds in the United States, other countries, or both). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Program instructions for the operating system, the object-oriented programming system, the processes of the illustrative embodiments, and applications or programs, including applications 105, 133, and 113 in FIG. 1, are each located on one or more storage devices, such as hard disk drive 226 or CD-ROM 230, and may be loaded into at least one of one or more memories, such as main memory 208, read only memory 224, or one or more peripheral devices, for execution by processing unit 206. Program instructions may also be stored permanently in non-volatile memory and either loaded from there or executed in place. For example, a program code according to an embodiment can be stored in non-volatile memory and loaded from there into DRAM.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA) or another mobile computing device, which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in north bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Depending upon the particular implementation of data processing system 200, data processing system 200 may further include or communicate with a display device, such as a monitor, a screen element, or a touch-screen interface. Data processing system 200 may accept inputs in a variety of other forms besides the example inputs described above. For example, a touch-screen can provide an input in the manner of a keyboard or a mouse pointing device, non-touch gesture input devices that detect a user's motions can similarly provide input to data processing system 200. A biometric sensor, a camera, or an eye motion sensor can provide visual input and analytical information such as facial recognition and other biometric information. A microphone can provide audio input such as for voice recognition services. A variety of input devices and human-machine interface devices can provide other types of inputs such as gesture services, motion services (e.g., Global Positioning System based motion detection. Any type of input and output can be integrated into a user interface design, and the same are contemplated within the scope of the illustrative embodiments.

Figure 3:
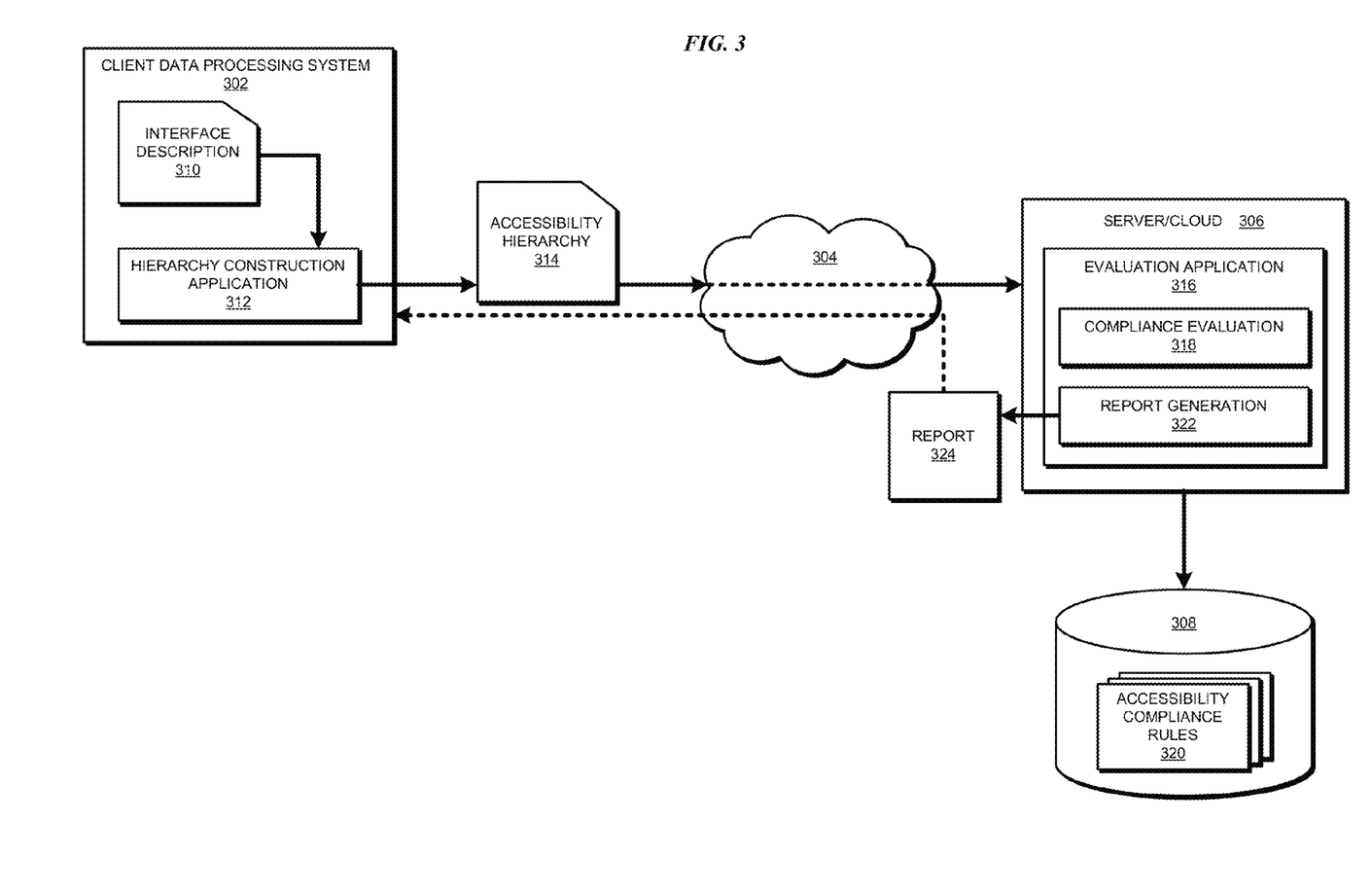
FIG. 3 depicts a block diagram of a configuration for evaluating accessibility compliance of a user interface design in accordance with an illustrative embodiment.

With reference to FIG. 3, this figure depicts a block diagram of a configuration for evaluating accessibility compliance of a user interface design in accordance with an illustrative embodiment. Client data processing system 302 (client) is an example of client 112 or device 132 in FIG. 1. Network 304 is an example of network 102 in FIG. 1. Data processing system 306 (server) can be a server data processing system, such as server 104 in FIG. 1, or a combination of one or more physical and virtual data processing systems in a cloud computing environment. Repository 308 can be implemented using storage 108 in FIG. 1.

In operation, client 302 presents a user interface including one or more accessibility features. Interface description 310 contains a description of the elements of the user interface, including one or more elements implementing the one or more accessibility features.

Hierarchy construction application 312 (client application) uses interface description 310 in the manner described elsewhere in this disclosure, to construct accessibility hierarchy 314. Accessibility hierarchy 314 organizes certain elements used in or reachable from the user interface, such that the organization can be evaluated for accessibility compliance in the manner of an embodiment.

Client application 312 sends accessibility hierarchy 314 over network 304 to server 306. Evaluation application 316 receives accessibility hierarchy 314.

Component 318 selects one or more rules from accessibility compliance rules 320 in repository 308. Component 318 evaluates the accessibility attributes of the elements in accessibility hierarchy 314 for compliance with the accessibility parameters defined in a selected rule.

Component 322 produces accessibility compliance report 324. Depending on the particular implementation, report 324 may include compliance failure description of certain elements of the user interface, failure and compliance descriptions of certain elements, a degree of severity of a compliance failure, a recommendation to remedy a compliance failure, or a combination thereof.

In one embodiment, evaluation application 316 transmits report 324 to client 302, such as for use by the user who may be interacting with the user interface or an application that may be presenting the user interface. In another embodiment, evaluation application 316 produces report 324 for use by an entity other than the user or the application, such as to a standards body, a manufacturer of the application, a public interest group, or a regulating entity.

Figure 4:
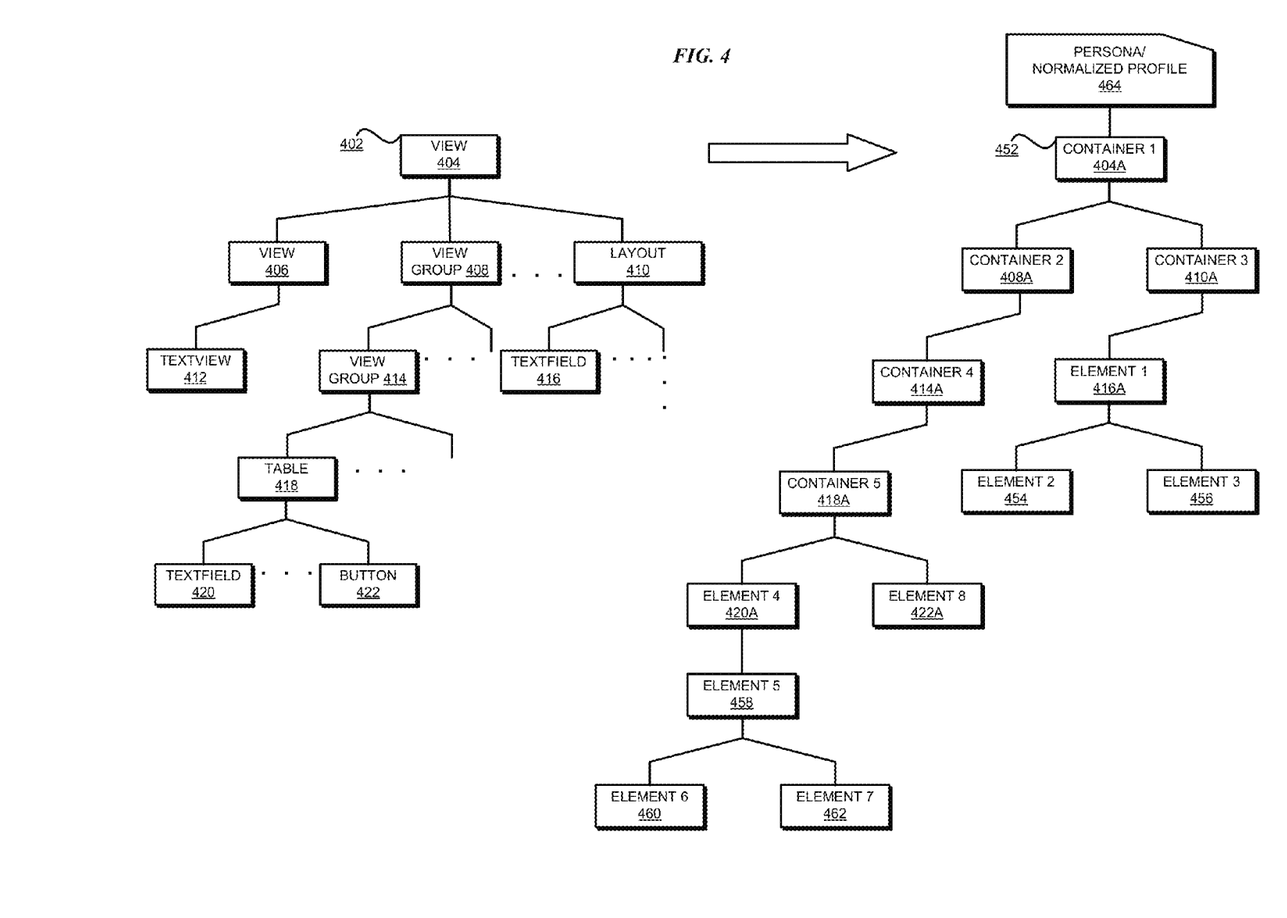
FIG. 4 depicts a process of generating an accessibility hierarchy for evaluating accessibility compliance of a user interface design in accordance with an illustrative embodiment.

With reference to FIG. 4, this figure depicts a process of generating an accessibility hierarchy for evaluating accessibility compliance of a user interface design in accordance with an illustrative embodiment. Hierarchy 402 (interface hierarchy) is an example organization of example user interface elements, as described in an example interface description, such as interface description 310 in FIG. 3. Hierarchy 452 is an example of accessibility hierarchy 314 generated by hierarchy construction application 312 in FIG. 3 corresponding to interface hierarchy 402.

Only as an example, and without implying any limitation thereto, assume that the user interface is an interface from an iOS application using Apple's iOS platform (iOS and Apple are trademarks of Apple Inc. in the United States and in other countries). Interface hierarchy 402 begins at node "view" 404. Node 404 is a container element node because node 404 is a parent node to one or more other nodes, such as example nodes 406, 408, and 410. Assume that node 406 is a view type container element, and includes leaf node 412, which is some textual visual content. Leaf node 412 is an individual element because leaf node 412 is not a parent to any other node in interface hierarchy 402. Only as an example to illustrate the operation of an embodiment, assume that individual element 412 comprises static textual content.

Similarly, node 408 is a container node of type "view group" and includes another "view group" type container element 414. Node 410 is a layout type container element, and among other things, includes text-field type individual element 416 for content. Again, only as an example to illustrate the operation of an embodiment, assume that individual element 412 comprises audio or video content.

Container element 414 includes another container element 418, which is a table type container element. Table 418 includes, among other things, individual nodes 420 and 422. Only as an example to illustrate the operation of an embodiment, assume that individual element 420 is a text-field type element and comprises active or dynamically-generated content. Individual element 422 is a button type control element on the user interface, which allows some action to be performed on the active content of individual element 420. Active or dynamically generated content, as in individual node 420, is an element of a user interface whose exact nature or type is not specified or described in the interface description or interface hierarchy 402, but it resolved or populated on the user interface at run-time. As an example, assume that dynamically generated content 420 under certain circumstances would result in a uniform resource locator (URL), a link, to some content that calls, launches, or presents additional controls. Some examples of such content are audio or video data, reference to launch another application (which may present another user interface), and data to transition to another user interface within the application.

An application implementing an embodiment, such as hierarchy construction application 312 in FIG. 3, roots accessibility hierarchy 452 at container element 404A, which corresponds to node 404 in interface hierarchy 402. If any view-level accessibility attributes are defined or available for node 404, the application selects and adds those attributes to node 404A.

Given the example static content of node 412 as described above, in an example operation, the application determines that nodes 406 and 412 are not candidates for accessibility features. Accordingly, the application omits including nodes corresponding to nodes 406 and 412 in accessibility hierarchy 452.

The application similarly adds nodes 408A, 412A, 414A, 416A, 418A, 420A, and 422A to accessibility hierarchy 452. Nodes 408A, 414A, 416A, 418A, 420A, and 422A correspond to nodes 408, 414, 416, 418, 420, and 422, respectively, in interface hierarchy 402. Where available or determinable, the application adds the accessibility attributes to a node in accessibility hierarchy 452. For example, node 422 may not include any accessibility attributes in interface hierarchy 402; however, nodes 414 and 418—both of which are parent nodes to node 422, may define same or distinct accessibility attributes. Accordingly, the application determines that node 422 inherits at least a subset of the accessibility attributes from one or both parent nodes. The application therefore adds such a subset of accessibility attributes to node 422A in accessibility hierarchy 452.

Note that in one embodiment, adding the subset of accessibility attributes to node 422A can be avoided if the parent-child relationship of node 422A with other nodes in accessibility hierarchy 452 remains the same as the parent-child relationships of corresponding node 422 in interface hierarchy 402, and that subset of accessibility attributes remains available at node 422A through such relationships in accessibility hierarchy 452. In another embodiment, adding the subset of accessibility attributes to node 422A is needed if the parent-child relationship of node 422A with other nodes in accessibility hierarchy 452 is different from the parent-child relationships of corresponding node 422 in interface hierarchy 402, owing to any reorganization, omission, addition, or replication operations performed by the application in accessibility hierarchy 452. Due to such operations, the subset of accessibility attributes available at node 422 would not available through the relationships of node 422A in accessibility hierarchy 452, and has to be expressly added to node 422A to correctly communicate the accessibility features of node 422 on the user interface.

Given the example audio or video content of node 416 as described above, in an example operation, the application determines that node 416 will call or present additional controls or elements that should be evaluated for accessibility even though such controls or elements are not described in interface hierarchy 402. Accordingly, using a suitable process, determines another user interface that will be launched or presented for interacting with the audio or video content of node 416. The application identifies the controls or elements such other user interface does include or would include. The application includes nodes corresponding to such controls or elements as nodes 454 and 456 in accessibility hierarchy 452.

Without implying any limitation thereto, one example process for identifying the other user interface can include examining configuration information for the application that presents the user interface of interface hierarchy 402. Such examining reveals the identity, location, and configuration of the plugin that would be launched to interact with audio or video content. Any suitable method can then be used to determine the user interface the plugin presents, and the controls or elements situated thereon.

An embodiment can then operate on such other user interface and the controls or elements to determine their accessibility attributes. Once determines, nodes 454 and 456 can be constructed for such controls or elements, and their accessibility attributes can be used to populate the accessibility attributes of nodes 454 and 456.

Given the example active or dynamically generated content of node 420 as described above, in an example operation, the application determines that node 420 will call or present additional controls or elements that should be evaluated for accessibility even though such controls or elements are not described in interface hierarchy 402. Accordingly, using a suitable process, additional elements that will be presented for interacting with the active content of node 420. The application identifies the controls or elements, which may themselves be in some hierarchy. Accordingly, the application includes nodes corresponding to such organization of controls or elements as nodes 458, 460, and 462, along with their determined accessibility attributes, in accessibility hierarchy 452.

In some implementations, an application that presents the user interface corresponding to interface hierarchy 402 may allow identifying the application exactly or by a class or category of the application. Under certain circumstances, a user of the user interface may similarly allow identifying the user exactly or by a class or category of the user. Thus, an embodiment associates one or more profiles, normalized profiles, or a combination thereof, 464, with accessibility hierarchy 452. A normalized profile can describe a class of applications that present similar user interfaces or accessibility features. A normalized profile can also describe a persona, e.g., a characteristic or feature common to a class of users.

The example process of defining nodes 454-462 is not intended to be limiting on the illustrative embodiments. From this disclosure, those of ordinary skill in the art will be able to conceive other ways of identifying user interface elements not specified in interface hierarchy 402, identifying their accessibility attributes, and including them in accessibility hierarchy 452. Such other ways are implementation dependent and therefore not conducive to exhaustive listing or description herein, but are contemplated within the scope of the illustrative embodiments.

Figure 5:
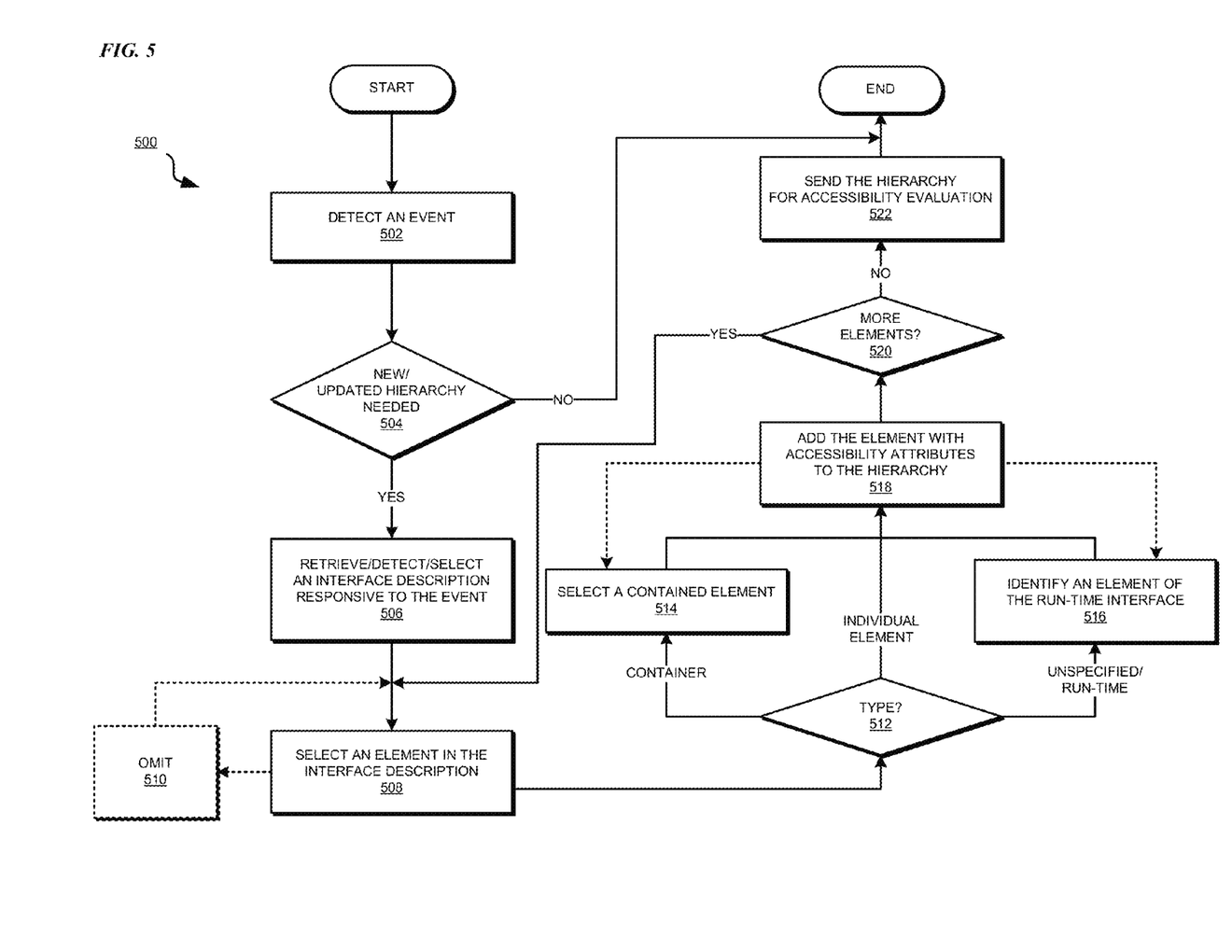
FIG. 5 depicts a flowchart of an example process for constructing an accessibility hierarchy in accordance with an illustrative embodiment.

With reference to FIG. 5, this figure depicts a flowchart of an example process for constructing an accessibility hierarchy in accordance with an illustrative embodiment. Process 500 can be implemented in hierarchy construction application 312 in FIG. 3. Process 500 produces an accessibility hierarchy, such as example accessibility hierarchy 452 in FIG. 4, for accessibility compliance evaluation.

The application detects an event or a change at a client data processing system (block 502). The application determines whether a new or updated accessibility hierarchy is needed responsive to the event (block 504). For example, the application determines whether the user interface that is presented in response to the event has been changed, and the change has not yet been mapped to an accessibility hierarchy, or has changed since it was last mapped an accessibility hierarchy. If a new or updated accessibility hierarchy is not needed ("No" path of block 504), the application ends process 500 thereafter, or returns to block 502 (not shown) and awaits detecting another event.

If a new or updated accessibility hierarchy is needed ("Yes" path of block 504), the application retrieves, detects, or otherwise selects an interface description for the user interface that is responsive to the event (block 506). The application selects an element in the interface description (block 508). Optionally, depending on the nature of the selected element, the application may omit including the element into the accessibility hierarchy being constructed (block 510). Omitting element 412 of FIG. 4 is an example omission according to block 510. Upon omitting an element, the application returns process 500 to select another element at block 508.

When not omitted, the application determines a type of the selected element (block 512). If the element is an individual element ("Individual" path of block 512), for example, element 422 of FIG. 4, the application proceeds to block 518. If the element is a container element ("Container" path of block 512), for example, element 418 of FIG. 4, the application selects a contained element, to wit, a leaf node or an individual element, or another container element in the selected element (block 514). The application proceeds to block 518 thereafter. If the element indicates further unspecified elements, or an element that is resolved at run-time ("Unspecified/run-time" path of block 512), for example, element 416 of FIG. 4, the application identifies an element of the interface presented at run-time (block 516). The application proceeds to block 518 thereafter.

The application adds the individual element, the container and contained elements, or the element from the run-time interface, as the case may be, along with the corresponding set of stated, derived, or computed accessibility attributes, to the accessibility hierarchy (block 518). Depending on the nature of the container element or the run-time interface, the application may return to blocks 514 or 516, respectively, until all elements in the container or the run-time interface have been added (or omitted) at block 518.

The application determines whether more elements remain in the interface description (block 520). If more elements remain in the interface description ("Yes" path of block 520), the application returns to block 508 and selects another element. If no more elements remain in the interface description ("No" path of block 520), the application sends the accessibility hierarchy thus constructed for accessibility evaluation, such as to process 600 of FIG. 6, (block 522). The application ends process 500 thereafter.

In one embodiment, the application associates (not shown) one or more profiles or normalized profiles with the accessibility hierarchy before sending in block 522. The selection and association of profiles or normalized profiles can be performed in any suitable manner within the scope of the illustrative embodiments.

Figure 6:
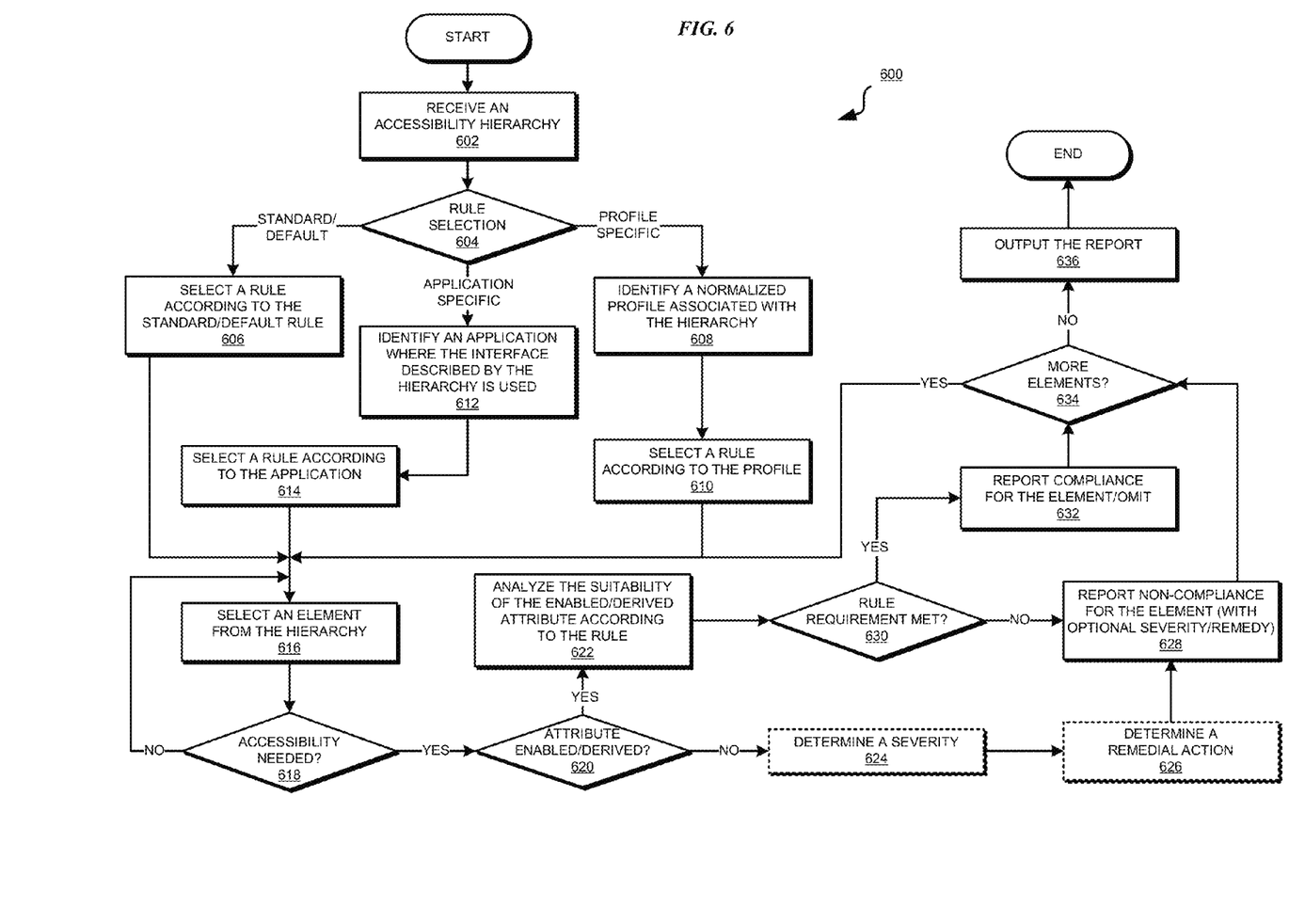
FIG. 6 depicts a flowchart of an example process for evaluating accessibility compliance of a user interface design in accordance with an illustrative embodiment.

With reference to FIG. 6, this figure depicts a flowchart of an example process for evaluating accessibility compliance of a user interface design in accordance with an illustrative embodiment. Process 600 can be implemented in evaluation application 316 of FIG. 3, to generate report 324 of FIG. 3.

The application, such as evaluation application 316 of FIG. 3, receives an accessibility hierarchy (block 602). For example, the accessibility hierarchy received in block 602 can be the accessibility hierarchy sent at block 522 in process 500 of FIG. 5.

The application determines a manner of selecting an accessibility compliance rule, such as from rules 320 in repository 308 of FIG. 3 (block 604). The selected rule can be any number and type of rules, e.g., a rule specific to a device, an application, an enterprise, a geography, a special case, a time, a purpose, an entity, a requirement, a usability, or a condition. When a standards-based rule or a default rule is to be selected ("standard/default" path of block 604), the application selects a rule according to the pertinent standard or default setting (block 606).

The application may determine to select one rule for the entire hierarchy, or apply multiple rules to the same hierarchy either one by one, or different rules for different nodes in the same hierarchy, depending on the particular needs of a given implementation.

When a user-specific rule is to be selected ("profile-specific" path of block 604), the application identifies the user or a category of the user according to a profile or a normalized profile of the user or user's category, respectively, associated with the hierarchy received in block 602 (block 608). The application selects a rule according to the identified user or user category (block 610).

When an application-specific rule is to be selected ("application-specific" path of block 604), the application identifies the application or a category of the application according to an application profile or a normalized profile of an application category, respectively, associated with the hierarchy received in block 602 (block 612). The application selects a rule according to the identified application or application category (block 614).

The application selects an element from the hierarchy (block 616). In one embodiment, additional or different rules may be applicable to the element selected in block 616. Accordingly, the embodiment selects such additional or different rules (not shown) as a part of block 616.

The application determines whether, according to the selected rule, including any additional or different element-specific rules, the selected element should be evaluated for accessibility (block 618). For example, even though an element of a user interface may include an accessibility attribute, a selected rule may not require accessibility for that type of elements, or may not require compliance evaluation for such offered accessibility.

If the selected element should not be evaluated for accessibility ("No" path of block 618), the application returns to block 616 and selects another element. If the selected element should be evaluated for accessibility ("Yes" path of block 618), the application determines whether one or more accessibility attributes have been enabled for the element, associated with the element, or derivable for the element from a parent of the element (block 620). If so ("Yes" path of block 620), the application analyzes the suitability of such accessibility attribute according to the selected rule (block 622).

If not ("No" path of block 620), the application optionally determines a degree of severity of the compliance failure for not associating an accessibility attribute with the element (block 624). The application further, optionally, determines a remedial action to correct the compliance failure (block 626). The remedial action may be specified in the rule, may be determinable from the rule, may be specified for use in conjunction with the rule, or otherwise identifiable based on the rule. The application reports the non-compliance of the element, with optional degree of severity and/or remedial actions (block 628).

From block 622, the application determines whether the analysis of block 622 indicates that the element has met the accessibility requirements of the selected rule (block 630). The rule requirement check of block 630 incorporates any element-specific additional or different rules when such additional or different rules are selected in block 616 (not shown). If not ("No" path of block 630), the application performs the operation of block 628. If the accessibility of the selected element meets the accessibility requirement of the rule ("Yes" path of block 630), the application optionally reports the in-compliance status of the element (block 632).

The application determines whether more elements are to be similarly analyzed from the accessibility hierarchy of block 602 (block 634). If so ("Yes" path of block 634), the application returns process 600 to block 616 to select another element. In one embodiment, additional or different rules may be applicable to the element selected in block 616. Accordingly, the embodiment selects such additional or different rules (not shown) as a part of block 616. The rule requirement check of block 630 incorporates such additional or different rules in such an embodiment.

If not ("No" path of block 634), the application outputs the accessibility compliance report, e.g., report 324 in FIG. 3 (block 636). The application ends process 600 thereafter.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, a computer implemented method, system, and computer program product are provided in the illustrative embodiments for evaluating accessibility compliance of a user interface design. While the embodiments and examples are described with respect to checking accessibility compliance of a user interface, the illustrative embodiments are similarly usable for other use-cases as well, and the same are contemplated within the scope of the illustrative embodiments. For example, using this disclosure, an embodiment can be configured to check compliance with usability rules, user-friendliness specifications, security rules, regulatory compliance rules, and other types of rules within the scope of the illustrative embodiments.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage device(s) or computer readable media having computer readable program code embodied thereon.

Any combination of one or more computer readable storage device(s) or computer readable media may be utilized. The computer readable medium may be a computer readable storage medium. A computer readable storage device may be, for example, but not limited to, an electronic, magnetic, optical, electromagnetic, or semiconductor system, apparatus, or device, or any suitable combination of the foregoing. More specific examples (a non-exhaustive list) of the computer readable storage device would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible device or medium that can store a program for use by or in connection with an instruction execution system, apparatus, or device. The term "computer readable storage device," or variations thereof, does not encompass a signal propagation media such as a copper cable, optical fiber or wireless transmission media.

Program code embodied on a computer readable storage device or computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to one or more processors of one or more general purpose computers, special purpose computers, or other programmable data processing apparatuses to produce a machine, such that the instructions, which execute via the one or more processors of the computers or other programmable data processing apparatuses, create means for implementing the functions/acts specified in the flowchart and/or block diagram block or blocks.

These computer program instructions may also be stored in one or more computer readable storage devices or computer readable media that can direct one or more computers, one or more other programmable data processing apparatuses, or one or more other devices to function in a particular manner, such that the instructions stored in the one or more computer readable storage devices or computer readable medium produce an article of manufacture including instructions which implement the function/act specified in the flowchart and/or block diagram block or blocks.

The computer program instructions may also be loaded onto one or more computers, one or more other programmable data processing apparatuses, or one or more other devices to cause a series of operational steps to be performed on the one or more computers, one or more other programmable data processing apparatuses, or one or more other devices to produce a computer implemented process such that the instructions which execute on the one or more computers, one or more other programmable data processing apparatuses, or one or more other devices provide processes for implementing the functions/acts specified in the flowchart and/or block diagram block or blocks.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method for evaluating compliance of a user interface design, the method comprising:
constructing a hierarchy at a first application, wherein the constructing comprises:
detecting an event at a client data processing system;
identifying a user interface as being responsive to the event, the user interface being described in an interface description;
selecting a first user interface element from the interface description;
identifying a first attribute of the first user interface element; and
adding the first user interface element and the first attribute of the first user interface element to the hierarchy responsive to determining that the first attribute is usable in a compliance testing;

receiving, from the first application executing in the client data processing system, the hierarchy of elements of the user interface, wherein a second application presents the user interface including a set of user interface elements at the client data processing system, the interface description comprising an organization of the set of user interface elements according to a manner of presenting the set of user interface elements on the user interface, the hierarchy being distinct from the organization by excluding from the set of user interface elements a second subset of those user interface elements which are irrelevant to the accessibility feature, wherein the accessibility feature is configured according to a rule in a usability specification, for a user with a disability, to assist in interacting with the user interface;

selecting a compliance rule from a set of compliance rules;

evaluating, using a processor and a memory, whether an attribute associated with an element in the hierarchy meets a condition specified in the compliance rule; and reporting, responsive to the evaluating being negative, the user interface element as being non-compliant with the compliance rule.

2. The method of claim 1, wherein the adding adds the first user interface element in a first location relative to a first root node of the hierarchy, wherein the first location is distinct from a second location of the first user interface element in the organization relative to a root of the organization.

3. The method of claim 1, wherein the first attribute is derived from a second user interface element in the interface description, wherein the second user interface element is a parent of the first user interface element.

4. The method of claim 1, wherein the organization omits a subset of the set of user interface elements, and wherein an omitted user interface element in the subset is resolved and reached from the user interface after the user interface has been presented at the client data processing system.

5. The method of claim 1, wherein the hierarchy is distinct from the organization by further including an element that is absent in the set of user interface elements in the interface description and is resolved at run-time.

6. The method of claim 1, wherein the attribute is an accessibility attribute configured to enable the user interface element accessible to a user suffering from an impairment in using the user interface element.

7. The method of claim 1, wherein the attribute is a usability attribute configured to measure a usability of the user interface element in a particular use-case scenario.

8. The method of claim 1, wherein the attribute is an accessibility attribute, wherein the compliance rule includes a desired value of the accessibility attribute of the user interface element, and wherein the evaluating compares a value of the accessibility attribute with the desired value of the accessibility attribute.

9. The method of claim 1, wherein the attribute is an accessibility attribute, wherein the compliance rule includes a desired accessibility attribute that is expected to be associated with a user interface element in the set of user interface elements, and wherein the evaluating compares the accessibility attribute with the desired accessibility attribute.

10. The method of claim 1, wherein the compliance rule is an accessibility specification provided by an entity other than a manufacturer of the second application.

11. The method of claim 1, further comprising:
identifying a profile associated with the hierarchy; and
determining, from the profile, a type of the second application, wherein the compliance rule corresponds to the type of the second application.

12. The method of claim 1, further comprising:
identifying a profile associated with the hierarchy; and
determining, from the profile, a category of a user who is interacting with the user interface, wherein the compliance rule corresponds to the category of the user.

13. The method of claim 12, wherein the category of the user identifies a first set of accessibility attributes for accessibility compliance testing according to the compliance rule, and wherein the category of the user identifies a second set of accessibility attributes to omit in the accessibility compliance testing.

14. The method of claim 1, wherein the receiving, the selecting, the evaluating, and the reporting are performed at a third application in a server data processing system.

15. The method of claim 14, wherein the server data processing system comprises a data processing system in a cloud computing environment.

16. A computer usable program product comprising a computer readable storage device including computer usable code for evaluating compliance of a user interface design, the computer usable code comprising:

computer usable code for constructing a hierarchy at a first application, wherein the constructing comprises:
detecting an event at a client data processing system;
identifying a user interface as being responsive to the event, the user interface being described in an interface description;
selecting a first user interface element from the interface description;
identifying a first attribute of the first user interface element; and
adding the first user interface element and the first attribute of the first user interface element to the hierarchy responsive to determining that the first attribute is usable in a compliance testing;

computer usable code for receiving, from the first application executing in the client data processing system, the hierarchy of elements of the user interface, wherein a second application presents the user interface including a set of user interface elements at the client data processing system, the interface description comprising an organization of the set of user interface elements according to a manner of presenting the set of user interface elements on the user interface, the hierarchy being distinct from the organization by excluding from the set of user interface elements a second subset of those user interface elements which are irrelevant to the accessibility feature, wherein the accessibility feature is configured according to a rule in a usability specification, for a user with a disability, to assist in interacting with the user interface;

computer usable code for selecting a compliance rule from a set of compliance rules;

computer usable code for evaluating, using a processor and a memory, whether an attribute associated with an element in the hierarchy meets a condition specified in the compliance rule; and computer usable code for reporting, responsive to the evaluating being negative, the user interface element as being non-compliant with the compliance rule.

17. The computer usable program product of claim 16, wherein the computer usable code is stored in a computer readable storage device in a data processing system, and wherein the computer usable code is transferred over a network from a remote data processing system.

18. The computer usable program product of claim 16, wherein the computer usable code is stored in a computer readable storage device in a server data processing system, and wherein the computer usable code is downloaded over a network to a remote data processing system for use in a computer readable storage device associated with the remote data processing system.

19. A data processing system for evaluating compliance of a user interface design, the data processing system comprising:
- a storage device including a storage medium, wherein the storage device stores computer usable program code; and
- a processor, wherein the processor executes the computer usable program code, and wherein the computer usable program code comprises:
- computer usable code for constructing a hierarchy at a first application, wherein the constructing comprises:
- detecting an event at a client data processing system;
- identifying a user interface as being responsive to the event, the user interface being described in an interface description;
- selecting a first user interface element from the interface description;
- identifying a first attribute of the first user interface element; and
- adding the first user interface element and the first attribute of the first user interface element to the hierarchy responsive to determining that the first attribute is usable in a compliance testing;
- computer usable code for receiving, from the first application executing in the client data processing system, the hierarchy of elements of the user interface, wherein a second application presents the user interface including a set of user interface elements at the client data processing system, the interface description comprising an organization of the set of user interface elements according to a manner of presenting the set of user interface elements on the user interface, the hierarchy being distinct from the organization by excluding from the set of user interface elements a second subset of those user interface elements which are irrelevant to the accessibility feature,
- wherein the accessibility feature is configured according to a rule in a usability specification, for a user with a disability, to assist in interacting with the user interface;
- computer usable code for selecting a compliance rule from a set of compliance rules;
- computer usable code for evaluating, using a processor and a memory, whether an attribute associated with an element in the hierarchy meets a condition specified in the compliance rule; and
- computer usable code for reporting, responsive to the evaluating being negative, the user interface element as being non-compliant with the compliance rule.

\* \* \* \* \*